No. 747,871. PATENTED DEC. 22, 1903.
E. C. ELDREDGE.
ELECTRICAL MEASURING INSTRUMENT.
APPLICATION FILED OCT. 3, 1903.
NO MODEL.

Witnesses:

Inventor:
Earl C Eldredge
by Chapin & Co.
Attorneys.

No. 747,871. Patented December 22, 1903.

UNITED STATES PATENT OFFICE.

EARL C. ELDREDGE, OF SPRINGFIELD, MASSACHUSETTS.

ELECTRICAL MEASURING INSTRUMENT.

SPECIFICATION forming part of Letters Patent No. 747,871, dated December 22, 1903.

Application filed October 3, 1903. Serial No. 175,550. (No model.)

*To all whom it may concern:*

Be it known that I, EARL C. ELDREDGE, a citizen of the United States of America, residing at Springfield, in the county of Hampden and State of Massachusetts, have invented new and useful Improvements in Electrical Measuring Instruments, of which the following is a specification.

This invention relates to improvements in electrical measuring instruments, and has particular reference to pocket-voltmeters and the like, the object of the invention being to provide an instrument of this type in which there shall be one contact-point on the case of the instrument and the other fitted to the end of a flexible metal cord, means being provided to house the contact-point on the case within the latter when the instrument is not in use and to effect the projection thereof through the case when desired; and the invention consists, essentially, in means to effect the movement of a contact-point into and out of the case of the instrument of which it constitutes one of the working parts.

Figure 1:
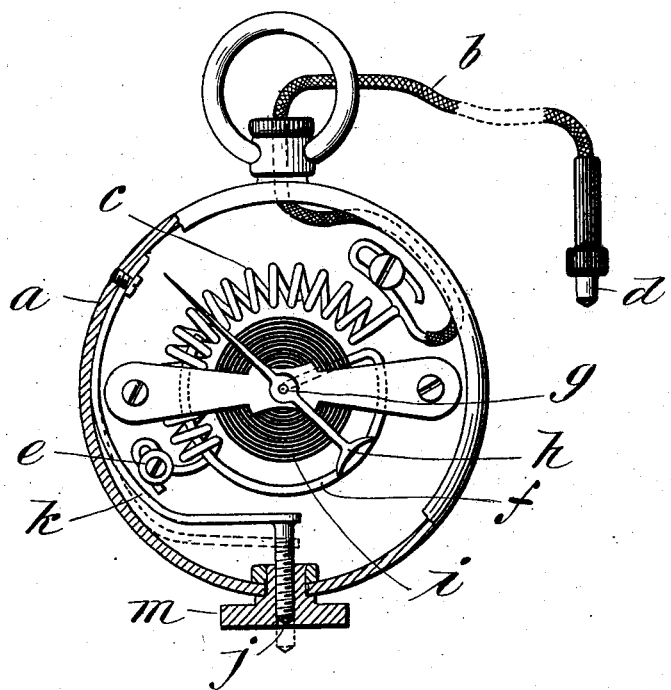
Figure 2:
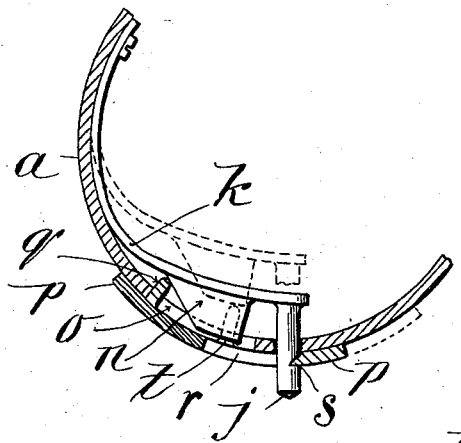

In the drawings forming part of this application, Figure 1 is a partly-sectional plan view of an electrical measuring instrument having my invention applied thereto, the indicator-dial being removed. Fig. 2 is a view similar to Fig. 1, but showing only a part of the casing of the instrument and illustrating a modification of the construction shown in Fig. 1.

Referring to the drawings, *a* indicates the case of the instrument, made, as is usual in this type, in the form of a watch, *b* indicating a flexible metal cord passing into the case *a* through the stem thereof, its inner end being secured to one terminal of a solenoid-coil *c*, which is insulated from the case, as is also said metal cord. The free end of the cord *b* has secured to it the usual contact-point *d*. The opposite end of the solenoid is attached to the case at *e*. The armature is indicated by *f* and is circular in form, like the solenoid, and is supported on a pivot *g*, carrying a pointer *h*, which when the solenoid is energized moves over a scale on a dial (not shown) against the action of a spiral spring *i*, which will return it to normal position when the instrument is not in use. This particular construction of instrument has no relation to this invention and is only shown as illustrative of the type of instrument to which the invention is applied. The invention is applicable to any electrical instrument in which it would be desirable to have a contact-point project from the case and be retractable therein when not in use.

In carrying out my invention the contact-point *j*, which is secured to and projects through the case of the instrument, is preferably so applied to the latter that when it is extended out through the case in operative position it will be so held as to resist endwise pressure thereon to such a degree as will insure intimate contact with any surface to which it is applied. Thus the instrument may be held in one hand in position for reading the scale on the dial and the contact-point *j* pressed against a surface, and the other contact-point *d*, attached to the flexible cord *b*, may be applied by the other hand of the user to any other surface. A very desirable manner of operating this contact-point *j* is shown in the drawings, and it consists in securing it to the end of a spring-arm *k*, (applied to the inside of the case circumferentially thereof,) the free end of the spring being of such shape as to permit the radial movement of the contact-point without causing it to bind. This contact-point is threaded and engaged by a nut *m*, secured in the wall of the case in any desirable manner which will permit it to be rotated. Thus by turning the nut *m* the contact-point may be screwed in and out of the casing, and in its innermost position its sharpened point will be located within the nut, thus preventing it from wearing the pocket, (these instruments being substantially like a watch and carried in the same manner.) While this is a convenient way of constructing this instrument to retract the contact-point within the case, some other means to accomplish the same end may be used without departing from the spirit of the invention. For example, instead of screwing the contact-point in and out, as just described, the construction shown in Fig. 2 may be used, which consists in mounting the contact-point on an arm substantially like that shown in Fig. 1 and providing the under side of said arm with the cam projection $n$, which may extend through a slot $o$ in the edge of the case, a slide $p$ being fitted outside of and circumferentially of the latter, having a boss $q$ thereon to engage with said projection $n$, an elongated slot $r$ being formed in the slide, through which the contact-point extends when in operative position. The slide at one end of this slot is beveled off to form an edge $s$ to enter a notch cut in the side of the contact-point, whereby when the slide is in the position shown in this figure the point will be locked against retraction; but when the slide is moved to the right it will disengage itself first from the pin, and the boss $q$ acting on the projection $n$ will then retract the contact-point within the case, the final position of the slide being with the boss under the flat part $t$ of the projection $n$ and the slide covering the opening in the case through which the pin was retracted.

It is to be understood that where such terms as "within the case" or "through the wall of the case" or "in and out of the case" have been used in this specification not merely is the circular case proper referred to, but also the stem, for example, or any similar projection within which the contact-point might be retracted without actually entering the case. All such constructions would obviously fall within the scope of this invention.

Having thus described my invention, what I claim, and desire to secure by Letters Patent of the United States, is—

1. In an electrical measuring instrument, a suitable case, a contact-point on the latter, and means to move said point into and out of the case.

2. An electrical measuring instrument comprising a case, and devices within the case for indicating the volume or intensity of an electrical current, a contact-point located in the case, and means to eject the point through the wall of the case and to retract it within the case, together with a flexible metallic connection extending from the case, and a second contact-point connected to the free end of said connection.

3. In an electrical measuring instrument, a suitable case, a contact-point for the latter normally located in the case, means to effect the ejection of the point through the wall of the case, and means to lock it against retraction, when in ejected position.

4. The combination with the case of an instrument for measuring electrical currents, of a flexible metallic connection secured to the case, a contact-point secured to the free end of said connection, and a second contact-point on the case, and means to move the last-named point through the wall of the case.

EARL C. ELDREDGE.

Witnesses:
WM. H. CHAPIN,
K. I. CLEMONS.